A. G. JACKULVIS.
UNICYCLE.
APPLICATION FILED APR. 29, 1909.
948,859.
Patented Feb. 8, 1910.
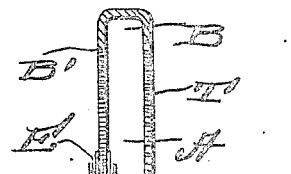
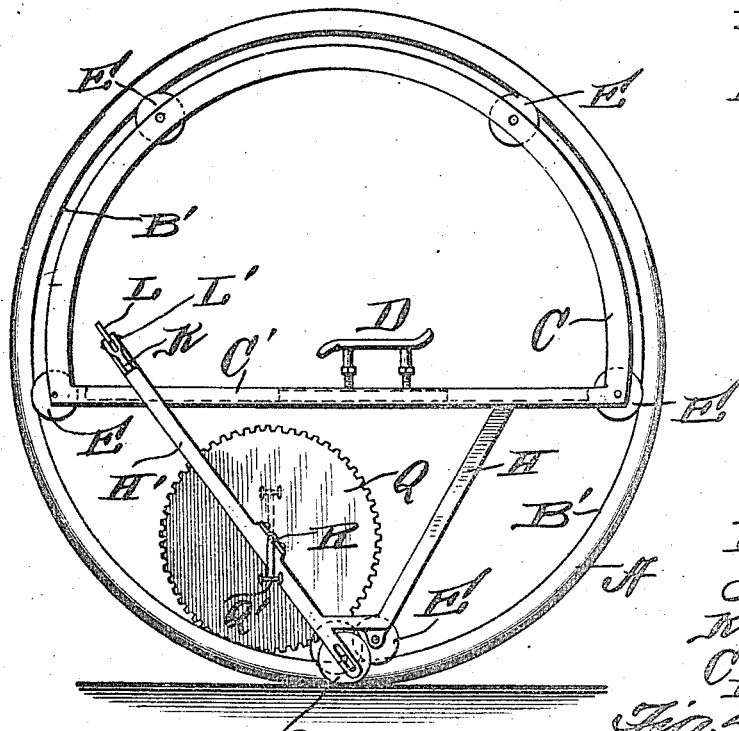
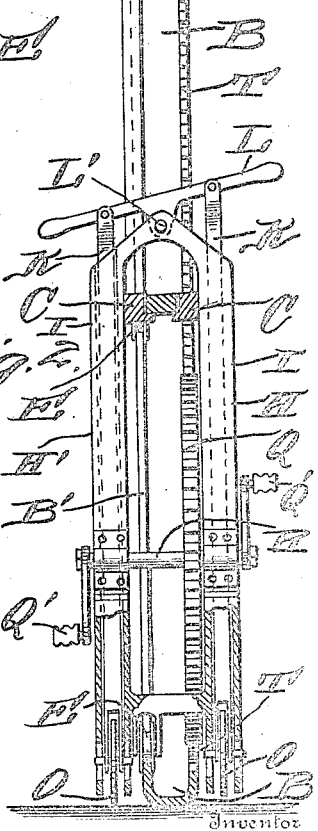

UNITED STATES PATENT OFFICE.

ANTHONY G. JACKULVIS, OF FORT TOTTEN, NEW YORK.

UNICYCLE.

948,859. Specification of Letters Patent. Patented Feb. 8, 1910.

Application filed April 29, 1909. Serial No. 493,060.

*To all whom it may concern:*

Be it known that I, ANTHONY G. JACKULVIS, a citizen of the United States, residing at Fort Totten, in the county of Queens and State of New York, have invented certain new and useful Improvements in Unicycles; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in unicycles and comprises various details of construction, combinations and arrangements of parts which will be hereinafter fully described and then specifically defined in the appended claims.

My invention is illustrated in the accompanying drawings, in which:—

Figure 1 is a side elevation of the invention. Fig. 2 is a sectional view, and Fig. 3 is a plan view of the propelling and steering apparatus.

Reference now being had to the details of the drawings by letter, A designates a circular outlined wheel which has an annular groove B upon the inner marginal edge thereof.

C is a frame upon which a seat D is adapted to slide and E designates groove wheels journaled in said frame and adapted to travel upon one of the flanges B' about the rim of the wheel. The horizontally disposed portion C' of the frame is positioned, it will be noted, below the transverse center of the wheel in order to bring the center of gravity below the center. V-shaped bars H and H' are fastened at their upper ends to the horizontally disposed portion of the frame and their lower ends carry one of said grooved wheels. Mounted in the hollow tubings I, parallel to each other, are the two rods K, the upper ends of which are connected to the handle L and a wheel O is journaled in the forked end of each of said rods and are adapted to travel one upon either side of the flanges of the wheel A. Said rods have slight longitudinal movements, the handle L being pivotally mounted upon a pivot L' and, as one rod or the other is pushed down, one wheel or the other O is adapted to be moved without the circumference of the wheel A and in contact with the ground for the purpose of flaring the device.

A gear wheel Q is mounted upon a crank shaft R journaled in bearings in the bar H' and the pedals Q' are fixed to said crank shaft. The teeth of said wheel Q are adapted to mesh with gear teeth T formed in the inner marginal edge of the wheel A and afford means whereby the unicycle may be propelled.

By the provision of a unicycle made as shown and described, it will be noted that the seat being adjustable may be utilized for persons of different heights and, by the manipulation of the handle L being tilted in one direction or the other, the device may be steered while a forward propulsive movement may be imparted thereto by the rotation of the crank shaft by the gear shaft driving the wheel A.

What I claim to be new is:—

1. A unicycle comprising a wheel with two circular outlined flanges, one of which has teeth upon its inner marginal edge, a frame, grooved wheels journaled thereon and adapted to ride one of said flanges, a seat upon said frame, a tilting lever, bars pivotally connected to said lever, one upon each side of the pivotal point of the latter, tubings upon said frame and through which said bars are adapted to move longitudinally, and wheels carried by said bars and positioned one upon either side of the flanged wheel and adapted to be projected beyond the circumference of the latter and against the ground.

2. A unicycle comprising a wheel with two circular outlined flanges, one of which has teeth upon its inner marginal edge, a frame, grooved wheels journaled thereon and adapted to ride one of said flanges, a seat upon said frame, a tilting lever, bars pivotally connected to said lever, one upon each side of the pivotal point of the latter, tubings upon said frame and through which said bars are adapted to move longitudinally, said tubings having elongated slots near their lower ends, the lower ends of said bars being slotted, wheels having spindles mounted in said slotted ends and projecting through and adapted to move in the elongated slots in said tubings.

In testimony whereof I hereunto affix my signature in the presence of two witnesses.

ANTHONY G. JACKULVIS.

Witnesses:
  BROR. JOHNSSON,
  ERASTUS BELCHER.